US012556354B2

(12) United States Patent
Zhang et al.

(10) Patent No.: US 12,556,354 B2
(45) Date of Patent: Feb. 17, 2026

(54) TIMING EVENT TRIGGER FULL DUPLEX ABORTION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/473,866

(22) Filed: Sep. 13, 2021

(65) Prior Publication Data

US 2022/0085966 A1  Mar. 17, 2022

Related U.S. Application Data

(60) Provisional application No. 63/079,679, filed on Sep. 17, 2020.

(51) Int. Cl.
*H04L 5/14* (2006.01)
*H04L 5/00* (2006.01)
(Continued)

(52) U.S. Cl.
CPC .......... *H04L 5/1469* (2013.01); *H04L 5/0051* (2013.01); *H04L 27/2607* (2013.01); *H04W 56/0045* (2013.01)

(58) Field of Classification Search
CPC .................. H04L 27/2602; H04L 27/2607
See application file for complete search history.

(56) References Cited

U.S. PATENT DOCUMENTS 4,074,086 A * 2/1978 Falconer ............... H04L 5/1423
                                                    379/406.05
6,307,881 B1 * 10/2001 Noma ................. H04N 1/33346
                                                    358/436
(Continued)

FOREIGN PATENT DOCUMENTS

CN       108289325 A       7/2018
CN       108604978 A       9/2018
(Continued)

OTHER PUBLICATIONS

International Search Report and Written Opinion—PCT/US2021/050289—ISA/EPO—Dec. 23, 2021.
(Continued)

*Primary Examiner* — Wutchung Chu
*Assistant Examiner* — Berhanu D Belete
(74) *Attorney, Agent, or Firm* — QUALCOMM Incorporated

(57) ABSTRACT

Method and apparatus to allow a UE to request termination of an FD operation based on a timing different of uplink reception timing and downlink reception timing. The apparatus communicates with at least one TRP in a full duplex operation. The apparatus measures a timing difference of an uplink reception timing and a downlink reception timing of the full duplex operation. The apparatus transmits, to the at least one TRP, a request to terminate the full duplex operation based at least on the timing difference.

30 Claims, 12 Drawing Sheets

(51) Int. Cl.
*H04L 27/26* (2006.01)
*H04W 56/00* (2009.01)

(56) References Cited

U.S. PATENT DOCUMENTS

| | | | |
|---|---|---|---|
| 8,149,743 B1 | 4/2012 | Choksi | |
| 8,542,617 B2* | 9/2013 | Choi | H04L 5/14 370/293 |
| 2007/0009017 A1* | 1/2007 | Lin | H04L 5/1423 375/219 |
| 2009/0213765 A1* | 8/2009 | Rinne | H04L 1/0026 370/278 |
| 2009/0296609 A1* | 12/2009 | Choi | H04L 5/14 370/281 |
| 2010/0034123 A1* | 2/2010 | Razdan | H04W 4/10 370/277 |
| 2011/0051633 A1* | 3/2011 | Pan | H04W 56/0045 370/336 |
| 2011/0222445 A1* | 9/2011 | Alanara | H04L 1/0026 370/281 |
| 2012/0207038 A1* | 8/2012 | Choi | H04W 16/14 455/67.11 |
| 2012/0278759 A1* | 11/2012 | Curl | G16H 40/20 345/173 |
| 2014/0221034 A1* | 8/2014 | Renko | H04W 76/45 455/518 |
| 2015/0009865 A1* | 1/2015 | Sharma | H04W 76/45 370/277 |
| 2015/0023227 A1* | 1/2015 | Khoo | H04W 72/0446 370/280 |
| 2015/0055515 A1* | 2/2015 | Cheng | H04L 5/0007 370/278 |
| 2015/0109969 A1* | 4/2015 | Celebi | H04L 5/1461 370/278 |
| 2015/0189610 A1* | 7/2015 | Siomina | H04L 5/14 370/280 |
| 2015/0327198 A1* | 11/2015 | Axmon | H04W 56/0005 370/336 |
| 2015/0358964 A1* | 12/2015 | Tiirola | H04W 72/0446 370/280 |
| 2016/0234006 A1* | 8/2016 | Choi | H04W 72/121 |
| 2017/0033881 A1* | 2/2017 | Wu | H04W 76/27 |
| 2017/0048734 A1* | 2/2017 | Kusashima | H04W 16/32 |
| 2017/0311320 A1* | 10/2017 | Lunttila | H04W 48/00 |
| 2017/0331577 A1* | 11/2017 | Parkvall | H04W 8/18 |
| 2017/0331670 A1* | 11/2017 | Parkvall | H04W 52/0229 |
| 2017/0359161 A1* | 12/2017 | Montojo | H04W 72/0453 |
| 2017/0367058 A1* | 12/2017 | Pelletier | H04W 72/0446 |
| 2018/0014263 A1* | 1/2018 | Dinan | H04W 52/367 |
| 2018/0279334 A1* | 9/2018 | Lim | H04L 27/2607 |
| 2019/0222296 A1* | 7/2019 | Khandani | H04B 7/086 |
| 2019/0253976 A1* | 8/2019 | Pelletier | H04W 52/146 |
| 2019/0260485 A1* | 8/2019 | Byun | H04W 4/40 |
| 2019/0280837 A1* | 9/2019 | Sano | H04W 72/04 |
| 2020/0162289 A1* | 5/2020 | Ahn | H04L 5/0053 |
| 2020/0204319 A1* | 6/2020 | Dinan | H04W 72/0446 |
| 2020/0235980 A1 | 7/2020 | John Wilson et al. | |
| 2020/0337048 A1* | 10/2020 | Abedini | H04W 72/23 |
| 2021/0281386 A1* | 9/2021 | Xia | H04L 5/14 |
| 2021/0352510 A1* | 11/2021 | Zhang | H04B 7/0632 |
| 2021/0352604 A1* | 11/2021 | Yang | H04W 56/0045 |
| 2021/0409127 A1* | 12/2021 | Kim | H04J 11/00 |
| 2021/0410092 A1* | 12/2021 | Xu | H04W 56/005 |
| 2021/0410094 A1* | 12/2021 | Cui | H04W 56/0055 |
| 2022/0132445 A1* | 4/2022 | Kim | H04W 52/48 |
| 2022/0182160 A1* | 6/2022 | Su | H04B 17/309 |
| 2022/0183072 A1* | 6/2022 | Kang | H04W 56/0015 |

FOREIGN PATENT DOCUMENTS

| | | | |
|---|---|---|---|
| CN | 113079536 A * | 7/2021 | |
| EP | 2019509 A1 | 1/2009 | |
| WO | WO-2009147811 A1 * | 12/2009 | H04L 5/18 |
| WO | WO-2016048610 A1 * | 3/2016 | H04W 76/45 |
| WO | WO-2017029765 A1 * | 2/2017 | H04B 1/56 |
| WO | WO-2017135475 A1 * | 8/2017 | H04L 25/03 |
| WO | WO-2018080283 A2 * | 5/2018 | H04L 5/0064 |
| WO | WO-2018128428 A1 * | 7/2018 | H04W 56/003 |
| WO | WO-2020167100 A1 * | 8/2020 | H04W 52/48 |
| WO | WO-2020222458 A1 * | 11/2020 | H04L 5/14 |
| WO | WO-2022035000 A1 * | 2/2022 | H04W 8/24 |

OTHER PUBLICATIONS

Qualcomm Incorporated: "On Enhancements for Simultaneous Operation of IAB-Node's Child and Parent Links", 3GPP TSG RAN WG1 Meeting #102-e, 3GPP Draft, R1-2006826, 3rd Generation Partnership Project (3GPP), vol. RAN WG1, No. Aug. 17, 2020- Aug. 28, 2020, Aug. 8, 2020 (Aug. 8, 2020), 5 Pages, XP051918276, Retrieved from the Internet: URL: https://www.3gpp.org/ftp/tsg_ran/WG1_RL1/TSGR1_102-e/Docs/R1-2006826.zip [retrieved on Aug. 8, 2020] the whole document.

Dandan Z., et al., "Key Techniques Research on Full-duplex Wireless Communications", Science China Press, vol. 44, No. 8, Aug. 31, 2014, pp. 951-964.

Goyal S., et al., "Full Duplex Cellular Systems: Will Doubling Interference Prevent Doubling Capacity?", Full Duplex Communications, IEEE Communications Magazine, May 2015, pp. 121-127.

Shen Z., et al., "Dynamic Uplink-Downlink Configuration and Interference Management in TD-LTE", Technology Updates on LTE Advanced, IEEE Communications Magazine, Nov. 2012, pp. 51-59.

* cited by examiner

TIMING EVENT TRIGGER FULL DUPLEX ABORTION

CROSS REFERENCE TO RELATED APPLICATION(S)

This application claims the benefit of and priority to U.S. Provisional Application Ser. No. 63/079,679, entitled "Time Event Trigger Full Duplex Abortion" and filed on Sep. 17, 2020, which is expressly incorporated by reference herein in its entirety.

TECHNICAL FIELD

The present disclosure relates generally to communication systems, and more particularly, to a configuration for a timing event triggering a full duplex (FD) abortion.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus communicates with at least one transmission reception point (TRP) in a full duplex operation. The apparatus measures a timing difference of an uplink reception timing and a downlink reception timing of the full duplex operation. The apparatus transmits, to the at least one TRP, a request to terminate the full duplex operation based at least on the timing difference.

In an aspect of the disclosure, a method, a computer-readable medium, and an apparatus are provided. The apparatus may be a device at a base station. The device may be a processor and/or a modem at a base station or the base station itself. The apparatus communicates with a user equipment (UE) in a full duplex operation. The apparatus receives, from the UE, a request to terminate the full duplex operation based at least on a timing difference of an uplink reception timing and a downlink reception timing of the full duplex operation. The apparatus transmits, to the UE, an indication to terminate the full duplex operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
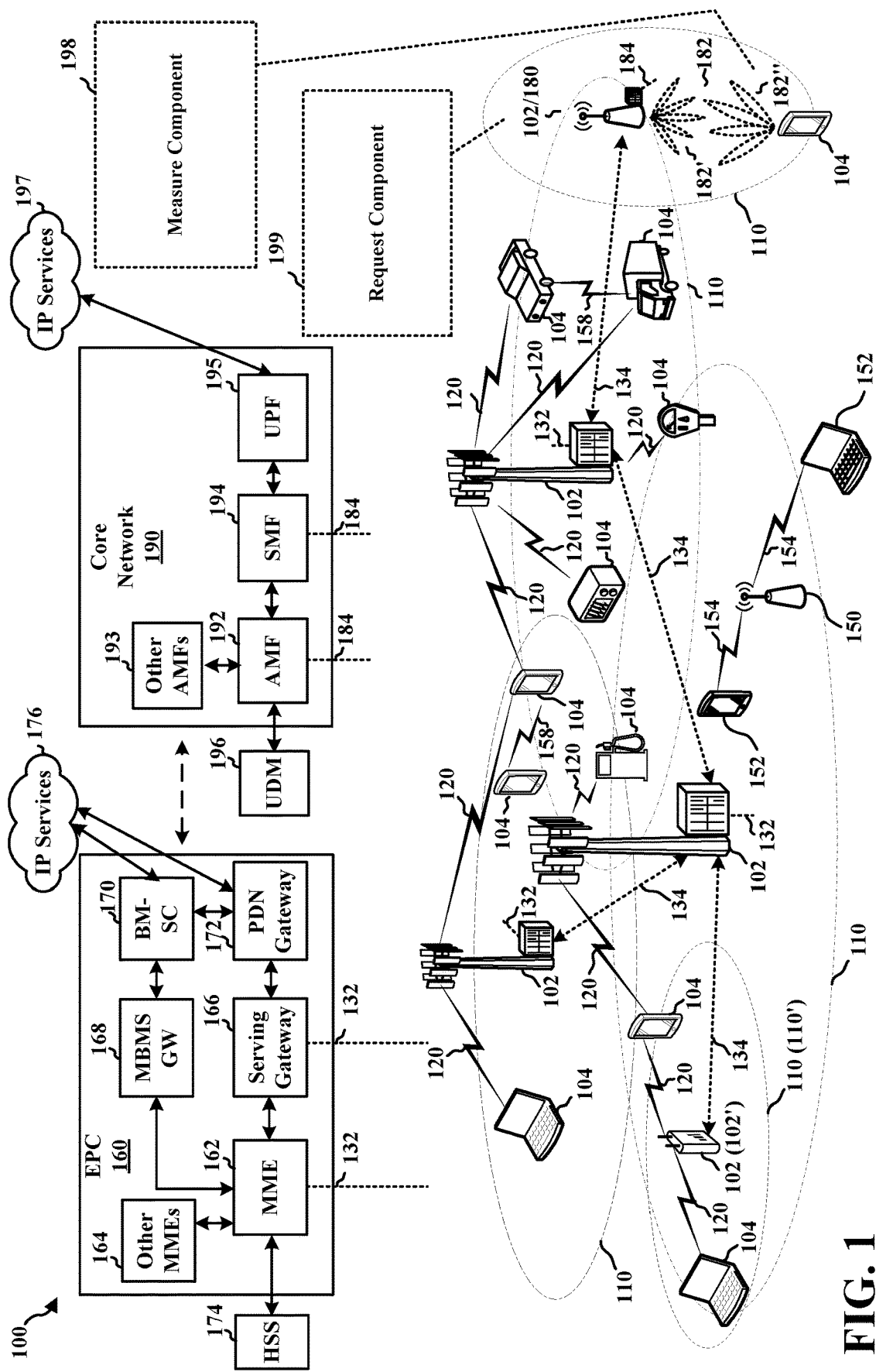
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to request a termination of an FD operation based on a timing difference of uplink reception timing and a downlink reception timing. For example, the UE 104 may comprise a measure component 198 configured to measure a timing difference of an uplink reception timing and a downlink reception timing of the full duplex operation. The UE 104 may communicate with at least one transmission reception point (TRP) in a full duplex operation. The UE 104 may measure a timing difference of an uplink reception timing and a downlink reception timing of the full duplex operation. The UE 104 may transmit, to the at least one TRP, a request to terminate the full duplex operation based at least on the timing difference.

Referring again to FIG. 1, in certain aspects, the base station 180 may be configured to terminate an FD operation with a UE based at least on a timing different of an uplink reception timing and a downlink reception timing. For example, the base station 180 may comprise a request component 199 configured to receive a request to terminate the FD operation. The base station 180 may communicate with a UE in a full duplex operation. The base station 180 may receive, from the UE, a request to terminate the full duplex operation based at least on a timing difference of an uplink reception timing and a downlink reception timing of the full duplex operation. The base station 180 may transmit, to the UE, an indication to terminate the full duplex operation.

Although the following description may be focused on 5G NR, the concepts described herein may be applicable to other similar areas, such as LTE, LTE-A, CDMA, GSM, and other wireless technologies.

Figures 2A, 2B, 2C, 2D:
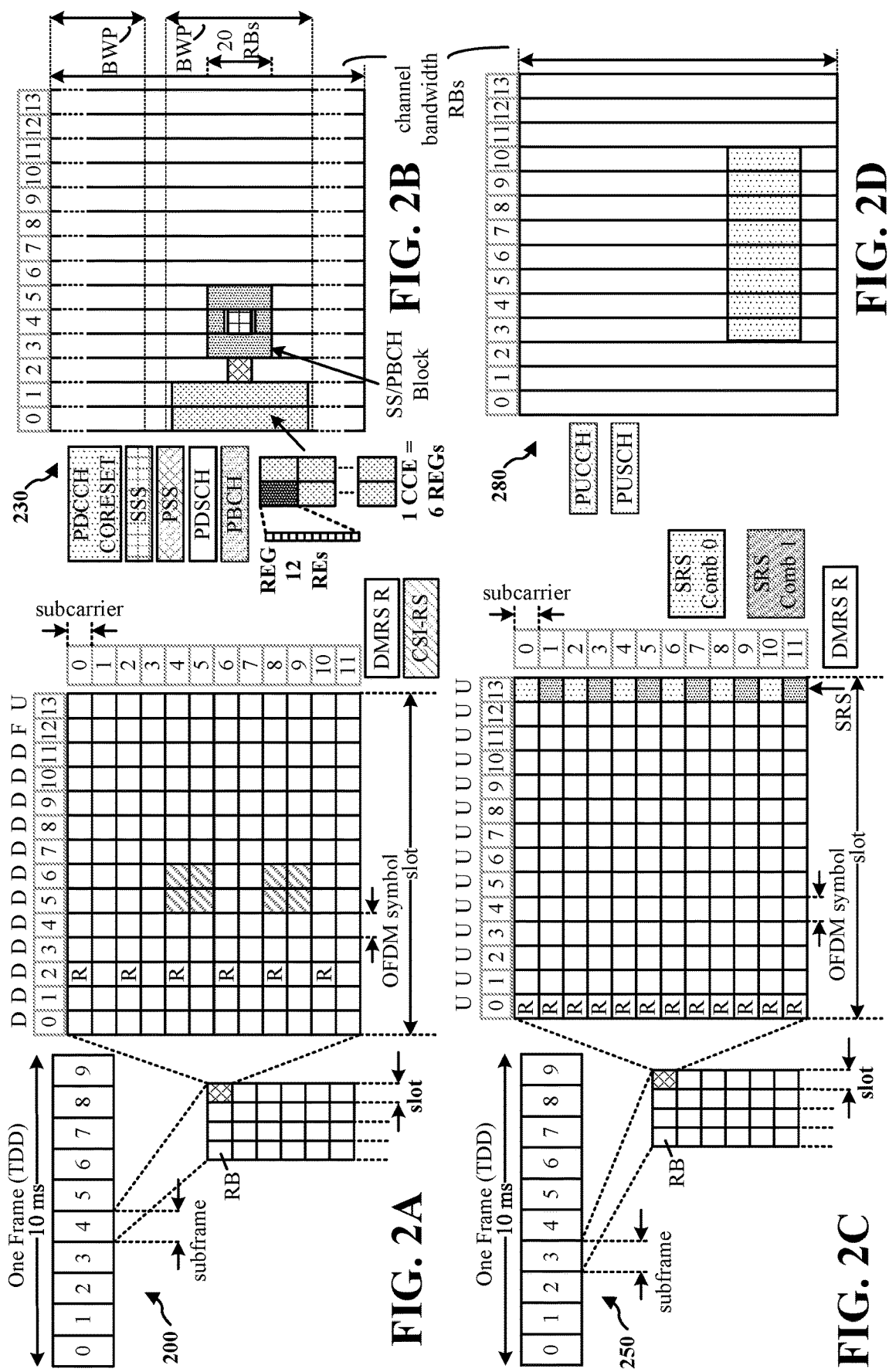
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
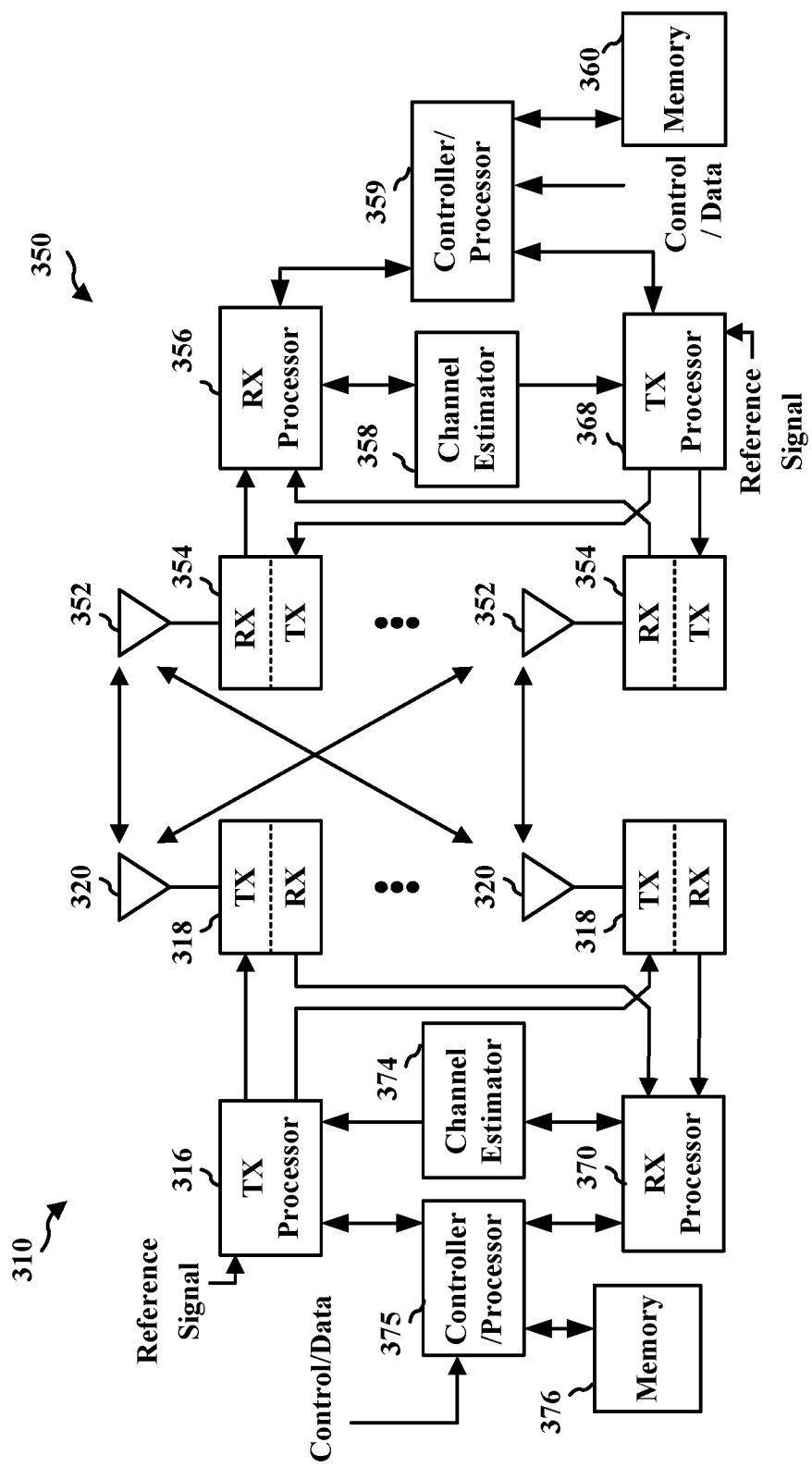
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems that support full duplex (FD) communication, self-interference may be an issue that may affect FD communications. Self-interference may occur if a transmitted signal is leaked to the receive port of the transmitting device. In addition, the transmitted signal may be reflected by an object back to the receive port, which may be known as clutter echo. Reducing self-interference, especially clutter echo, via spatial isolation by properly choosing transmit and receive beams or more advanced transmit/receive beamforming may assist in supporting FD communication. FD communication allows for simultaneous UL and DL transmission in FR2 and different associated aspects of procedures. Flexible TDD capability may be present at either a base station (e.g., gNB or TRP) or UE or both. For example, a UE in FD communication may transmit UL from one antenna panel and receive DL in another antenna panel. FD communication may be conditional on UL/DL beam separation. FD communication may result in a reduction of latency, such that it may be possible to receive a DL signal in UL only slots. At least another benefit is that FD communications may provide for a spectrum efficiency enhancement (e.g., per cell or per UE), which may allow for an increase in efficient resource utilization.

The downlink and uplink timing of FD communications should be aligned in order to mitigate or avoid inter-symbol interference or leakage in FD transmissions. For example, when a base station is in FD operation, the base station may utilize legacy timing advance (TA) mechanism to align timing. When a UE is in FD operation or is in FD operation at both the UE side and a base station, aligning the timing at both the UE and base station may cause interference in the FD transmissions if not properly aligned.

Aspects presented herein provide a configuration to trigger a termination of an FD operation based on a timing event. For example, aspects presented herein may allow a UE to request a termination (e.g., an abortion) of an FD operation based on a timing difference of uplink reception timing and a downlink reception timing. Aspects may further allow a base station to terminate (e.g., abort) an FD operation with a UE based at least on a timing difference of an uplink reception timing and a downlink reception timing.

Figure 4:
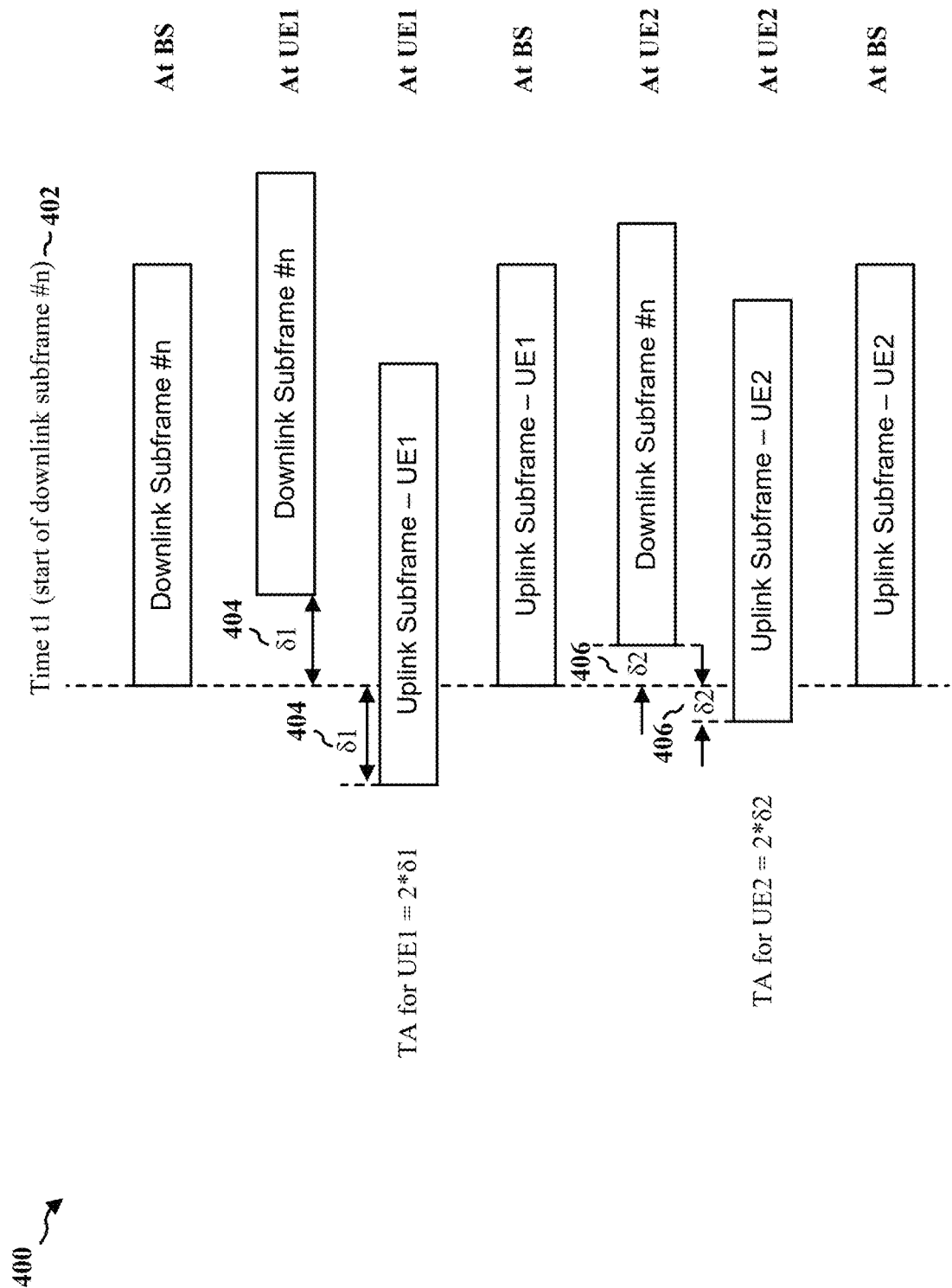
FIG. 4 is a diagram illustrating uplink and downlink reception timing.

FIG. 4 illustrates an example 400 of uplink and downlink reception timing for a half duplex operation. A base station may transmit and receive from a UE (e.g., UE1 or UE2). At the base station side, a timing boundary 402 should be aligned for downlink and uplink transmissions for all the UEs communicating with the base station. For example, for downlink the timing boundary 402 may be time 0, which may be the start of downlink subframe and may take the propagation delay $\delta 1$ 404 for the UE to receive the downlink transmission. The round trip time delay is twice the propagation delay $\delta 1$ 404, for the base station to receive an uplink transmission from the UE. The timing advance for the UE may be twice the propagation delay $\delta 1$ 404, and the timing advance may be sent to the UE. The UE may apply the timing advance to its uplink transmission to the base station based on the reception time of the downlink transmission received by the UE. The timing advance may be based on a distance between the UE and the base station. UEs that are closer to the base station may have a timing advance that is less than UEs that are further away from the base station. For example, the timing advance $\delta 2$ 406 may be less than the timing advance $\delta 1$ 404 because the UE having the timing advance $\delta 2$ 406 is closer to the base station than the UE having the timing advance $\delta 1$ 404.

Figure 5:
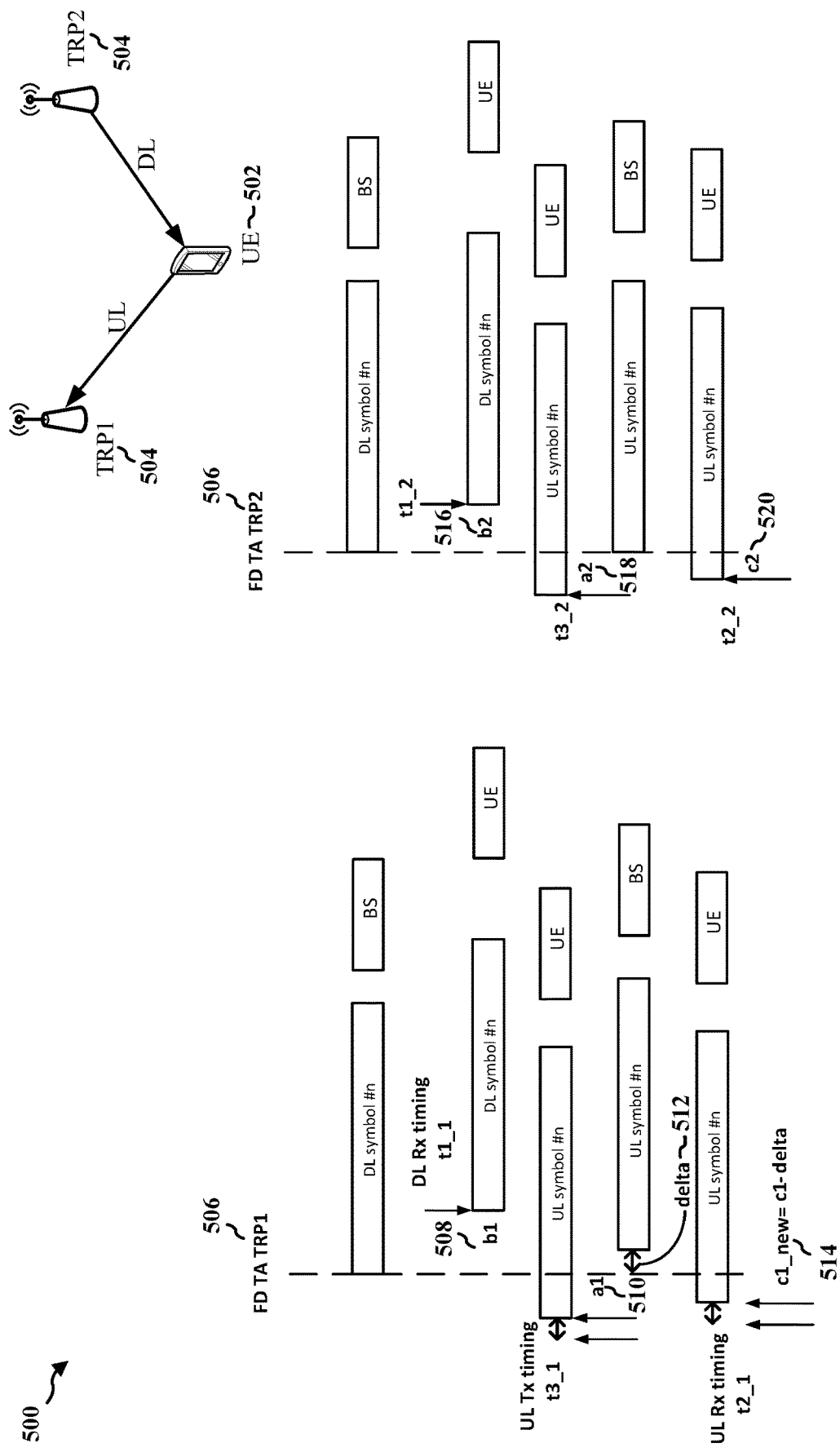
FIG. 5 is a diagram illustrating uplink and downlink reception timing.

FIG. 5 illustrates an example 500 of uplink and downlink reception timing for a full duplex operation. The example 500 may include a UE 502 and a first TRP (e.g., TRP1 504) and a second TRP (e.g., TRP2 504). The UE 502 may communicate with TRP1 and TRP2 in a full duplex operation. The UE 502 may receive downlink transmissions from the TRP2 504, and the UE 502 may transmit uplink transmissions to the TRP1 504. The TRP1 504 and TRP2 504 each have a timing boundary 506.

In full duplex communications, the timing difference per beam pair (e.g., uplink and downlink beam pair) at the UE side should have timing aligned so that the uplink and downlink transmissions may occur at the same time. Misaligned timing may lead to inter-symbol interference which may degrade the quality of the full duplex communications. The sum of the reception timings of the uplink and downlink signals should be less than a cyclic prefix (CP) length at the UE.

For example, TRP1 504 may have a downlink symbol that is transmitted from the TRP1 504 or the associated base station and the UE 502 may receive a transmission from the TRP1 504, after the propagation delay b1 508. The TRP1 504 has a downlink reception timing tl_1. The TRP1 504 may determine a timing advance with respect to the UE based on the combination of propagation delay b1 508 and a1 510. The TRP2 504 may have a timing advance with respect to the UE based on the combination of propagation delay b2 516 and a2 518. The propagation delay a1 510 is the uplink transmission from the UE to the TRP1 504. The TRP1 504 may receive the uplink transmission from the UE around the timing boundary 506 plus a delta 512. At the UE, the UE may also receive its own uplink transmission to the TRP1 504 or TRP2 504, which may be detected as a direct leakage or may be detected as a reflected signal that is reflected back to the UE, and this reception may have a propagation delay c1 514 or c2 520.

The UE 502 may receive a downlink transmission from the TRP2 504, and may have a downlink reception timing b2 516. The sum of the downlink reception timing b2 516 at the UE 502 and the uplink reception timing c1 514 (e.g., reflected signal) at the UE 502 should be less than the CP length at the UE 502. This is to ensure that OFDM orthogonality is maintained during the FD operation, which minimizes inter-symbol interference or leakage to different frequency bands. The downlink reception time minus the uplink reception time or b2+c1-delta<CP. The delta is on the base station side and may assist to reduce the value of b2+c1. The base station may provide a buffer or the delta within CP to assist in maintaining timing in FD operation. The delta may allow for the uplink transmission to be transmitted later in time in comparison to the original timing advance, such that the transmission may occur at the timing advance minus the delta 512. The UE 502 reception of its own uplink signal may be c1-delta 512. The value of delta 512 should be less than the CP in order for the base station to maintain orthogonality. However, if the delta is not within the CP, the timing of the FD communication may not be aligned.

The UE may be configured to request a new TA or a new delta if the uplink and downlink reception timing is not aligned. However, if a delta within the base station's allowed timing is not available to satisfy the UE side reception timing difference of the downlink signal and the uplink signal, then the UE may be configured to request a termination of the FD operation and switch to half duplex. The UE may send a new TA request based on its timing measurements of the uplink and downlink receptions. The UE may perform the measurements via Layer-1 (L1) signal to interference plus noise ratio (SINR) (L1-SINR) measurements. In some aspects, the UE may be configured to wait a period of time after a previous TA request to submit a new TA request. The period of time the UE may wait to submit a new TA request after a previous TA request may be preconfigured or signaled to the UE via radio resource control (RRC) signaling, media access control (MAC) control element (CE) (MAC-CE), or downlink control information (DCI). In some aspects, if a new TA request is triggered multiple times by the UE (e.g., based on L1-SINR resources reception timing measurements) within the period of time the UE is to wait to submit a new TA request after the previous TA request, then the UE may be configured to request to terminate the FD operation and switch to half duplex. The UE may send the termination request to the base station, and the base station may provide an indication to the UE to terminate the FD operation and switch to half duplex, in response to the base station receiving the request from the UE to terminate the FD operation.

Figure 6:
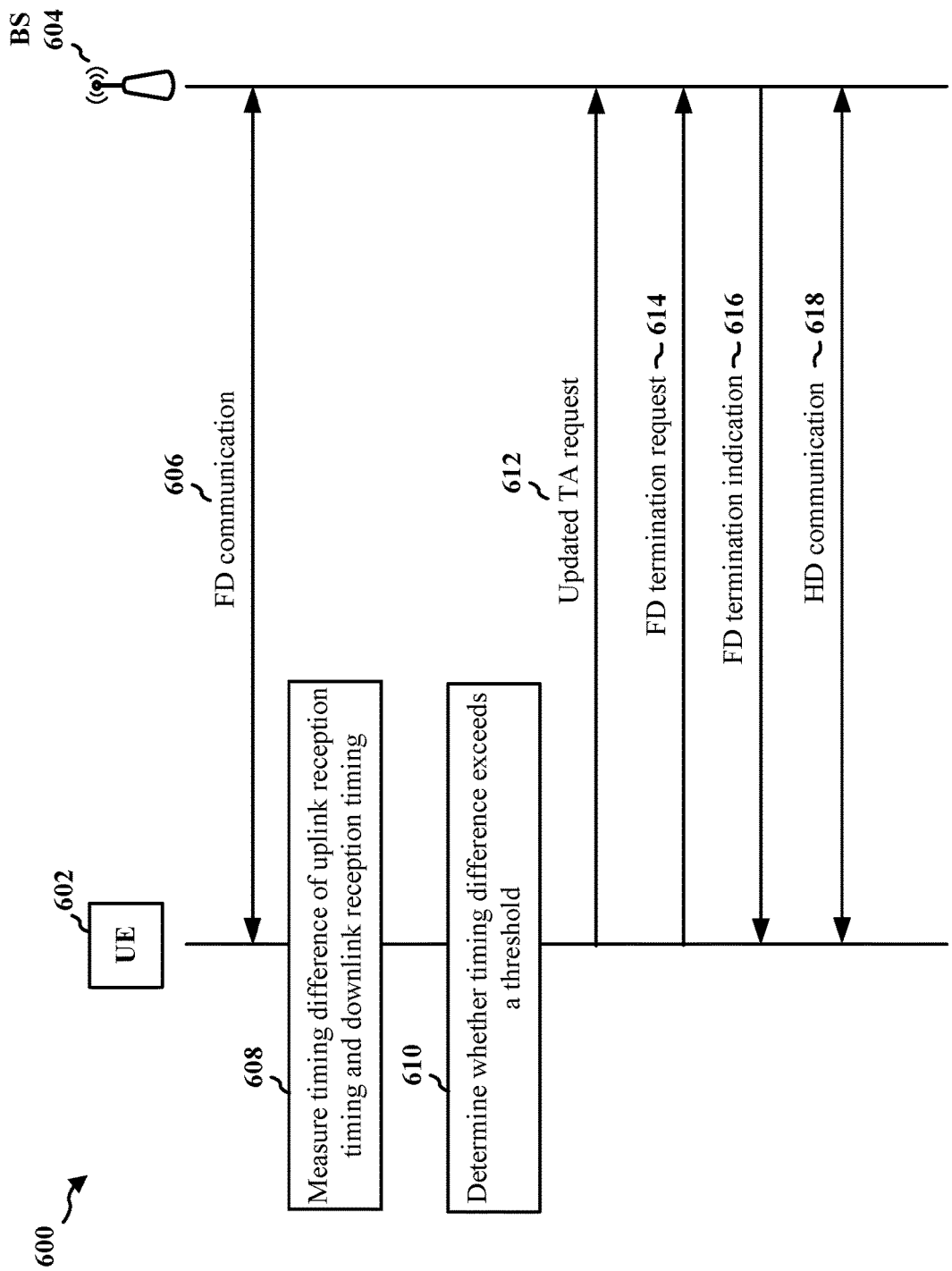
FIG. 6 is a call flow diagram of signaling between a UE and a base station.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

As illustrated at 606, the UE 602 communicate with at least one TRP in a full duplex (FD) operation. The at least one TRP may be associated with the base station 604. In some aspects, the UE 602 may communicate with a first TRP in the FD operation. In some aspects, the UE 602 may communicate with the first TRP and a second TRP in the FD operation. For example, the UE may receive a downlink transmission from the first TRP, and may transmit an uplink transmission to the second TRP in the FD operation. In some aspects, the first TRP and the second TRP may be associated with a respective base station. In some aspects, the first TRP and the second TRP may be associated with the base station 604.

As illustrated at 608, the UE 602 may measure a timing difference of an uplink reception timing and a downlink reception timing of the FD operation. In some aspects, the uplink reception timing may be measured in sounding reference signals (SRS) transmitted from an uplink beam and received by a downlink beam of the UE 602. In some aspects, the downlink reception timing may be measured in channel state information reference signals (CSI-RS) transmitted from a TRP and received by a downlink beam of the UE.

As illustrated at 610, the UE 602 may determine whether the timing difference exceeds a threshold. In some aspects, the threshold may comprise a cyclic prefix (CP) condition. In some aspects, the threshold comprises the CP condition plus a delta timing advance (TA) value. The delta TA value may be within the CP condition at the at least one TRP side. The delta TA value may be configured to reduce the timing difference of the uplink reception timing and the downlink reception timing to maintain the full duplex operation.

As illustrated at 612, the UE 602 may transmit a request for an updated TA. The UE 602 may transmit the request for the updated TA based on the timing difference of the uplink reception timing and the downlink reception timing. The UE 602 may transmit the request for the updated TA to the at least one base station 604. The at least one base station 604 may receive the request for the updated TA. The request for the updated timing advance may be based at least on L1-SINR measurements. In some aspects, transmission of the request for the updated TA may be sent after a period of time after a transmission of a previous request for an updated TA. The period of time for transmitting the request after the previous request may be preconfigured or configured by the at least one base station. In some aspects, the period of time for transmitting the request after the previous request may be signaled, to the UE 602, by the at least one base station 604 via RRC signaling, MAC-CE, or DCI. The request to terminate the full duplex operation may be transmitted if a plurality of requests for the updated timing advance are triggered within the period of time after the transmission of the previous request for the updated timing advance. The transmission of the plurality of requests for the updated timing advance may be prevented within the period of time, where the period of time may be preconfigured or signaled to the UE from a base station via RRC, MAC-CE, or DCI signaling.

As illustrated at 614, the UE 602 may transmit a request to terminate the FD operation. The UE 602 may transmit the request to terminate the FD operation based at least on the timing difference. The UE 602 may transmit the request to terminate the FD operation to the at least one TRP. The at least one TRP may be associated with the base station 604. The base station 604 may receive the request to terminate the FD operation. The base station may receive the request to terminate the FD operation based at least on a timing different of an uplink reception timing and a downlink reception timing of the FD operation. In some aspects, the request to terminate the full duplex operation may comprise a request to switch to a half duplex operation. In some aspects, receipt of the request to terminate the full duplex operation, by the base station 604, may be based on the timing difference exceeding a threshold. The threshold may comprise a CP condition. In some aspects, the threshold may comprise a CP condition plus a delta TA value. The delta TA value may be within the CP condition at the base station side. The delta TA value may be configured to reduce the timing difference of the uplink reception timing and the downlink reception timing to maintain the full duplex operation. In some aspects, the uplink reception timing may be measured in SRS transmitted from an uplink beam and received by a downlink beam of the UE 602. In some aspects, the downlink reception timing may be measured in CSI-RS transmitted from the base station and received by a downlink beam of the UE 602.

As illustrated at 616, the base station 604 may transmit an indication to terminate the FD operation. The base station 604 may transmit, to the UE 602, the indication to terminate the FD operation. The base station 604 may transmit the indication to terminate the FD operation in response to the receipt of the FD termination request of 614.

As illustrated at 618, the UE 602 may switch to a half duplex (HD) operation. The UE 602 may switch to the HD operation in response to transmitting the request to terminate the FD operation. In some aspects, the UE 602 may switch to the HD operation in response to receiving the FD termination indication from the at least one TRP at 616. The FD termination indication may include an indication to terminate the FD operation and switch to the HD operation. The base station 604 may switch to the HD operation in response to transmitting the indication to terminate the FD operation. The base station 604 may switch to the HD operation in response to transmitting, to the UE 602, the indication to terminate the FD operation. The UE 602 and the base station 604 may communicate with each other in the HD operation upon termination of the FD operation.

Figure 7:
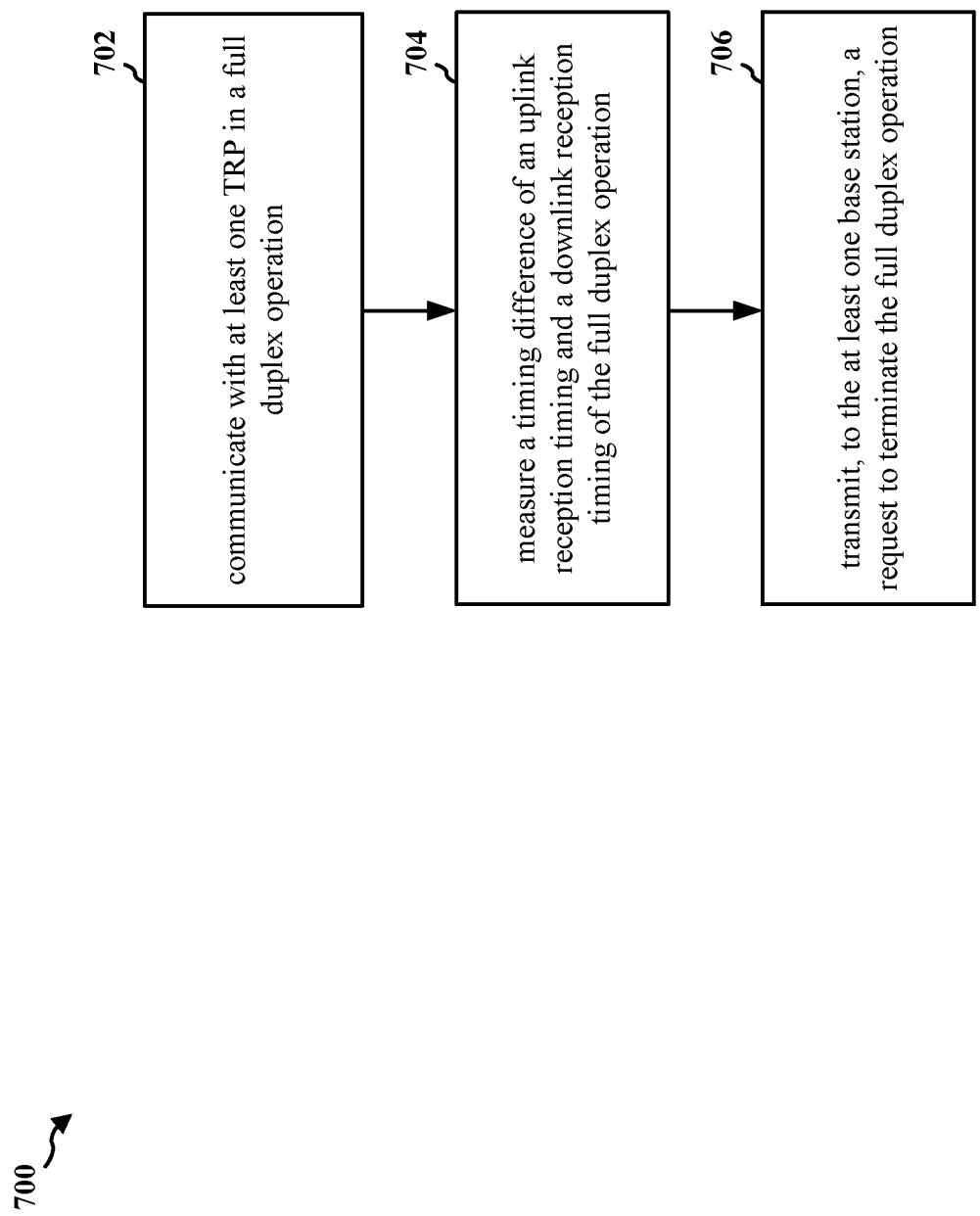
FIG. 7 is a flowchart of a method of wireless communication.

FIG. 7 is a flowchart 700 of a method of wireless communication. The method may be performed by a UE or a component of a UE (e.g., the UE 104, 502, 602; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to request a termination of an FD operation based on a timing difference of uplink reception timing and a downlink reception timing.

At 702, the UE may communicate with at least one TRP in a full duplex (FD) operation. For example, 702 may be performed by FD component 940 of apparatus 902. In some aspects, the UE may communicate with a first TRP in the FD operation. In some aspects, the UE may communicate with the first TRP and a second TRP in the FD operation. For example, the UE may receive a downlink transmission from the first TRP, and may transmit an uplink transmission to the second TRP in the FD operation.

At 704, the UE may measure a timing difference of an uplink reception timing and a downlink reception timing of the FD operation. For example, 704 may be performed by measure component 942 of apparatus 902. In some aspects, the uplink reception timing may be measured in SRS transmitted from an uplink beam and received by a downlink beam of the UE. In some aspects, the downlink reception timing may be measured in CSI-RS transmitted from a TRP and received by a downlink beam of the UE.

At 706, the UE may transmit a request to terminate the FD operation. For example, 706 may be performed by request component 946 of apparatus 902. The UE may transmit the request to terminate the FD operation based at least on the timing difference. The UE may transmit the request to terminate the FD operation to the at least one TRP. In some aspects, the request to terminate the full duplex operation may comprise a request to switch to a half duplex operation.

Figure 8:
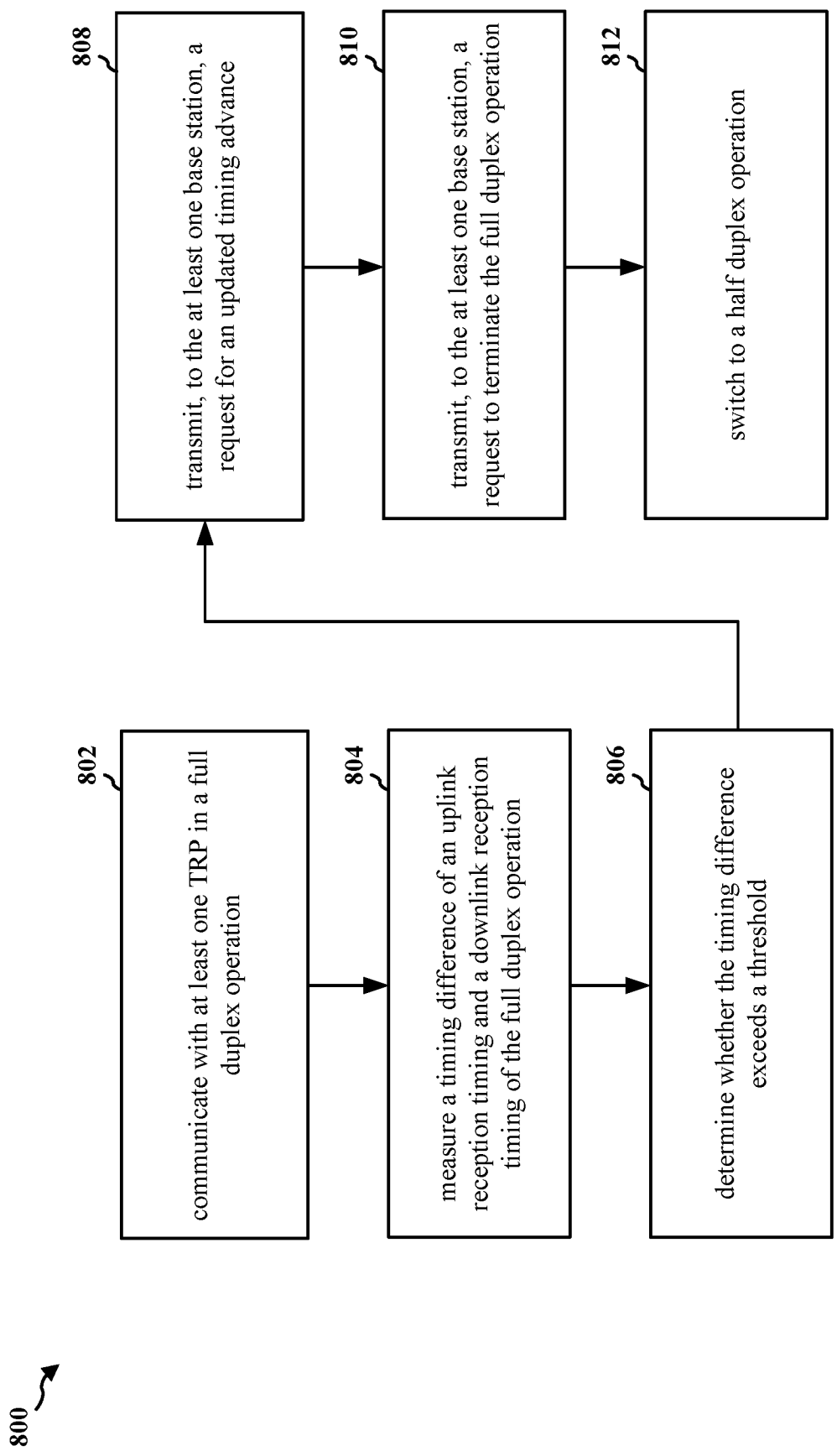
FIG. 8 is a flowchart of a method of wireless communication.

FIG. 8 is a flowchart 800 of a method of wireless communication. The method may be performed by a UE or a component of a UE (e.g., the UE 104, 502, 602; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to request a termination of an FD operation based on a timing difference of uplink reception timing and a downlink reception timing.

At 802, the UE may communicate with at least one TRP in a full duplex (FD) operation. For example, 802 may be performed by FD component 940 of apparatus 902. In some aspects, the UE may communicate with a first TRP in the FD operation. In some aspects, the UE may communicate with the first TRP and a second TRP in the FD operation. For example, the UE may receive a downlink transmission from the first TRP, and may transmit an uplink transmission to the second TRP in the FD operation.

At 804, the UE may measure a timing difference of an uplink reception timing and a downlink reception timing of the FD operation. For example, 804 may be performed by measure component 942 of apparatus 902. In some aspects, the uplink reception timing may be measured in SRS transmitted from an uplink beam and received by a downlink beam of the UE. In some aspects, the downlink reception timing may be measured in CSI-RS transmitted from a TRP and received by a downlink beam of the UE.

At 806, the UE may determine whether the timing difference exceeds a threshold. For example, 806 may be performed by determination component 944 of apparatus 902. In some aspects, the threshold may comprise a CP condition. In some aspects, the threshold comprises the CP condition plus a delta TA value. The delta TA value may be within the CP condition at the at least one TRP side. The delta TA value may be configured to reduce the timing difference of the uplink reception timing and the downlink reception timing to maintain the full duplex operation.

At 808, the UE may transmit a request for an updated TA. For example, 808 may be performed by request component 946 of apparatus 902. The UE may transmit the request for the updated TA based on the timing difference of the uplink reception timing and the downlink reception timing. The UE may transmit the request for the updated TA to the at least one base station. The request for the updated timing advance may be based at least on L1-SINR measurements. In some aspects, transmission of the request for the updated TA may be sent after a period of time after a transmission of a previous request for an updated TA. The period of time for transmitting the request after the previous request may be preconfigured or configured by the at least one base station. In some aspects, the period of time for transmitting the request after the previous request may be signaled, to the UE, by the at least one base station via RRC signaling, MAC-CE, or DCI. The request to terminate the full duplex operation may be transmitted if a plurality of requests for the updated timing advance are triggered within the period of time after the transmission of the previous request for the updated timing advance. The transmission of the plurality of requests for the updated timing advance may be prevented within the period of time, where the period of time may be preconfigured or signaled to the UE from a base station via RRC, MAC-CE, or DCI signaling.

At 810, the UE may transmit a request to terminate the FD operation. For example, 810 may be performed by request component 946 of apparatus 902. The UE may transmit the request to terminate the FD operation based at least on the timing difference. The UE may transmit the request to terminate the FD operation to the at least one TRP. In some aspects, the request to terminate the full duplex operation may comprise a request to switch to a half duplex operation.

At 812, the UE may switch to a half duplex (HD) operation. For example, 812 may be performed by HD component 948 of apparatus 902. The UE may switch to the HD operation in response to transmitting the request to terminate the FD operation. In some aspects, the UE may switch to the HD operation in response to receiving an FD termination indication from the at least one TRP. The FD termination indication may include an indication to terminate the FD operation and switch to the HD operation.

Figure 9:
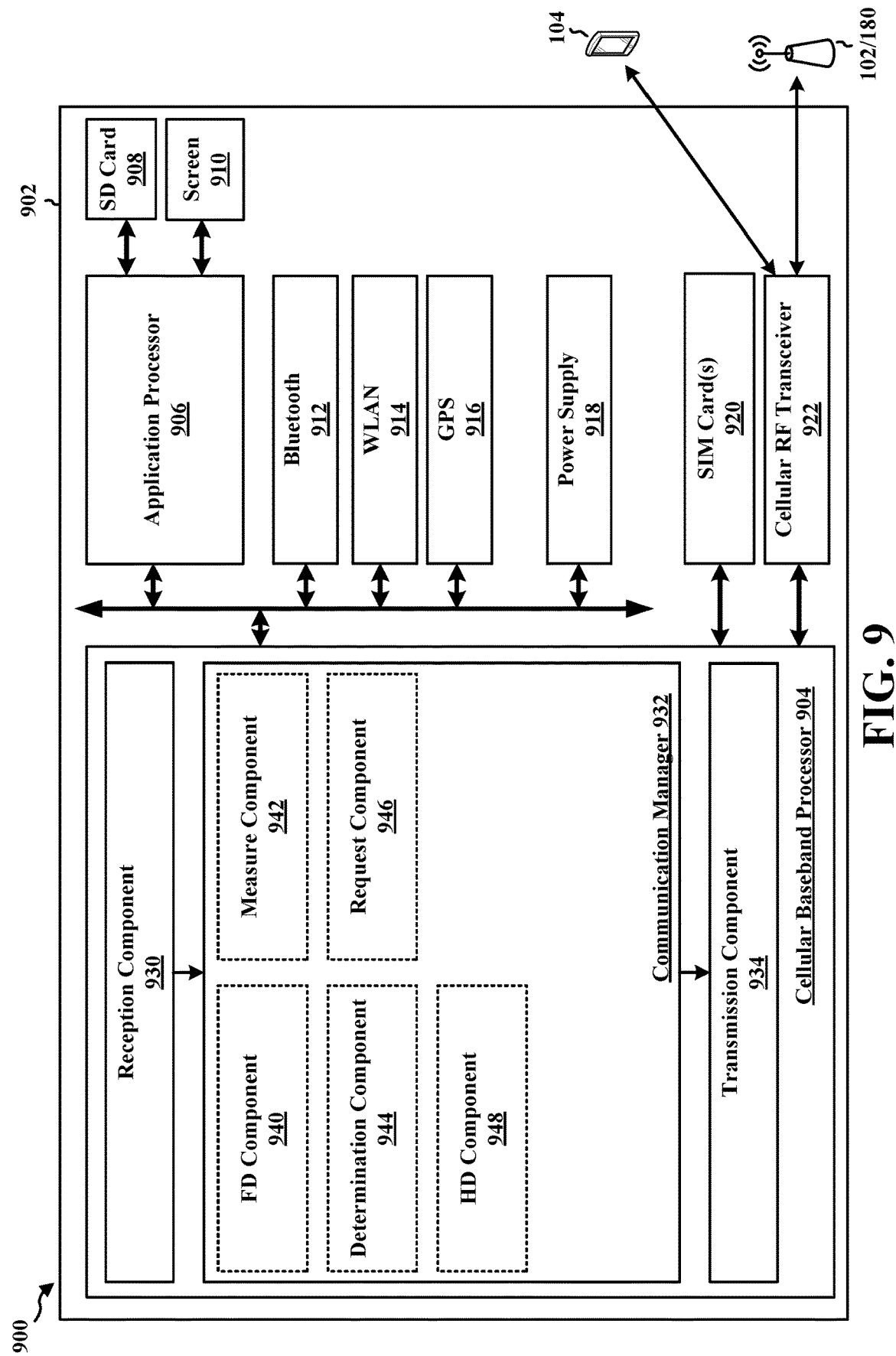
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes an FD component 940 that is configured to communicate with at least one TRP in an FD operation, e.g., as described in connection with 702 of FIG. 7 or 802 of FIG. 8. The communication manager 932 further includes a measure component 942 that is configured to measure a timing difference of an uplink reception timing and a downlink reception timing of the FD operation, e.g., as described in connection with 704 of FIG. 7 or 804 of FIG. 8. The communication manager 932 further includes a determination component 944 that is configured to determine whether the timing difference exceeds a threshold, e.g., as described in connection with 806 of FIG. 8. The communication manager 932 further includes a request component 946 that is configured to transmit a request to terminate the FD operation, e.g., as described in connection with 706 of FIG. 7 or 810 of FIG. 8. The request component 946 may be further configured to transmit a request for an updated TA, e.g., as described in connection with 808 of FIG. 8. The communication manager 932 further includes an HD component 948 that is configured to switch to an HD operation, e.g., as described in connection with 812 of FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for communicating with at least one TRP in a full duplex operation. The apparatus includes means for measuring a timing difference of an uplink reception timing and a downlink reception timing of the full duplex operation. The apparatus includes means for transmitting, to the at least one TRP, a request to terminate the full duplex operation based at least on the timing difference. The apparatus further includes means for determining whether the timing difference exceeds a threshold. The apparatus further includes means for transmitting, to the at least one base station, a request for an updated timing advance based on the timing difference of the uplink reception timing and the downlink reception timing. The apparatus further includes means for switching to a half duplex operation in response to transmitting the request to terminate the full duplex operation. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
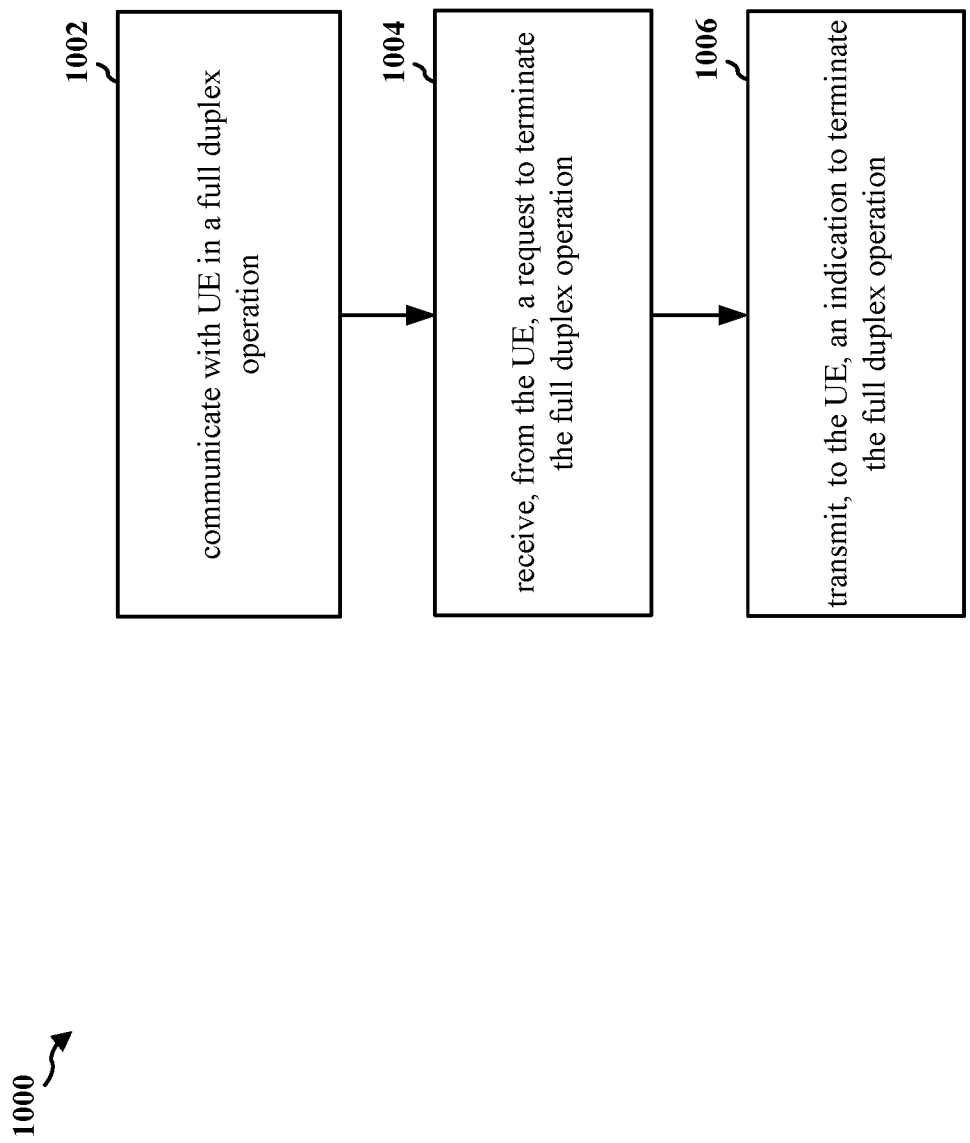
FIG. 10 is a flowchart of a method of wireless communication.

FIG. 10 is a flowchart 1000 of a method of wireless communication. The method may be performed by a base station or a component of a base station (e.g., the base station 102/180, 504, 604; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to terminate an FD operation with a UE based at least on a timing difference of an uplink reception timing and a downlink reception timing.

At 1002, the base station may communicate in an FD operation. For example, 1002 may be performed by FD component 1240 of apparatus 1202. The base station may communicate with a UE in the FD operation.

At 1004, the base station may receive a request to terminate the FD operation. For example, 1004 may be performed by request component 1242 of apparatus 1202. The base station may receive the request to terminate the FD operation based at least on a timing different of an uplink reception timing and a downlink reception timing of the FD operation. The base station may receive the request to terminate the FD operation from the UE. In some aspects, the request to terminate the full duplex operation may comprise a request to switch to a half duplex operation. In some aspects, receipt of the request to terminate the full duplex operation may be based on the timing difference exceeding a threshold. The threshold may comprise a CP condition. In some aspects, the threshold may comprise a CP condition plus a delta TA value. The delta TA value may be within the CP condition at the base station side. The delta TA value may be configured to reduce the timing difference of the uplink reception timing and the downlink reception timing to maintain the full duplex operation. In some aspects, the uplink reception timing may be measured in SRS transmitted from an uplink beam and received by a downlink beam of the UE. In some aspects, the downlink reception timing may be measured in CSI-RS transmitted from the base station and received by a downlink beam of the UE.

At 1006, the base station may transmit an indication to terminate the FD operation. For example, 1008 may be performed by indication component 1244 of apparatus 1202. The base station may transmit, to the UE, the indication to terminate the FD operation.

Figure 11:
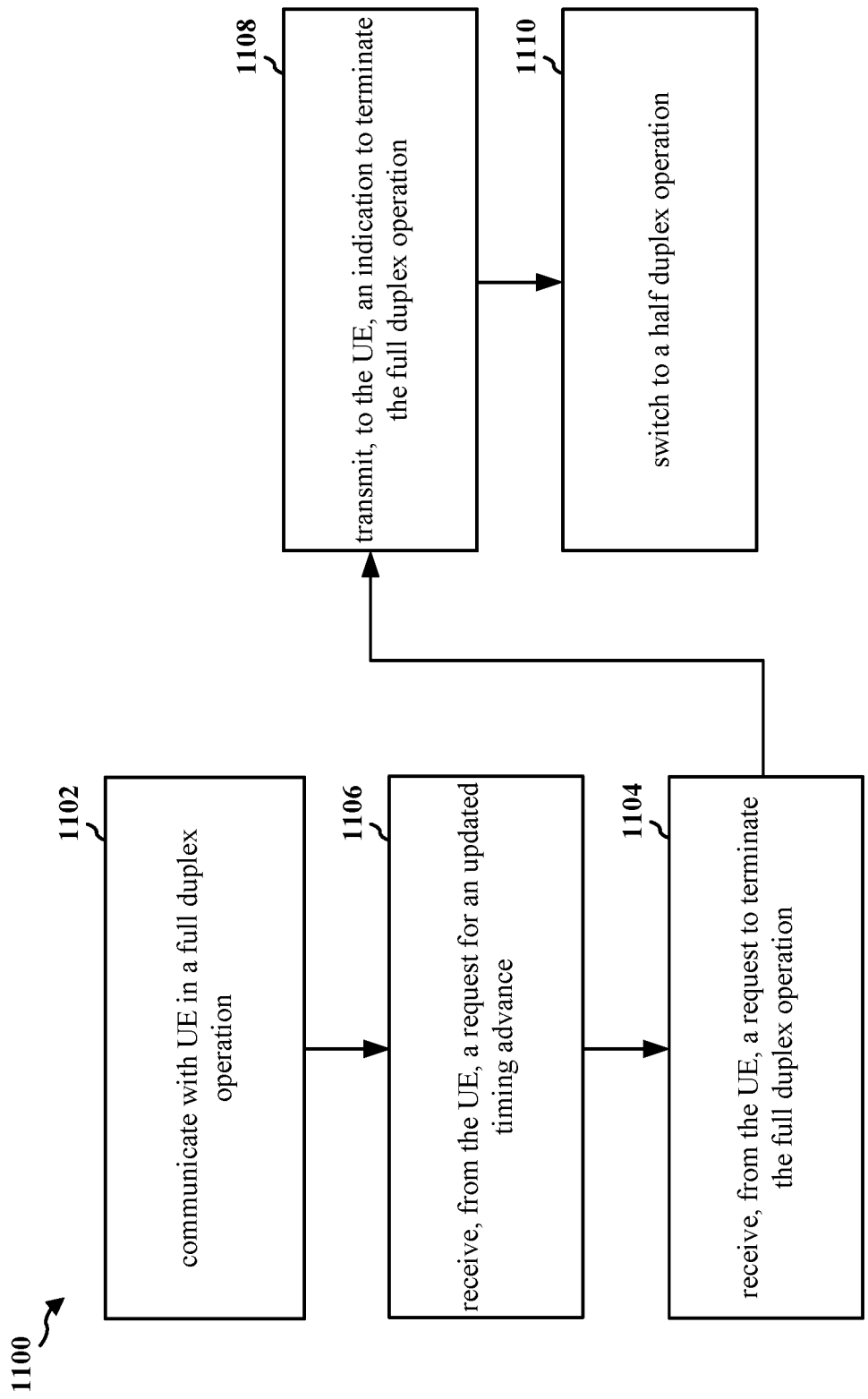
FIG. 11 is a flowchart of a method of wireless communication.

FIG. 11 is a flowchart 1100 of a method of wireless communication. The method may be performed by a base station or a component of a base station (e.g., the base station 102/180, 504, 604; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to terminate an FD operation with a UE based at least on a timing difference of an uplink reception timing and a downlink reception timing.

At 1102, the base station may communicate in an FD operation. For example, 1102 may be performed by FD component 1240 of apparatus 1202. The base station may communicate with a UE in the FD operation.

At 1104, the base station may receive a request to terminate the FD operation. For example, 1104 may be performed by request component 1242 of apparatus 1202. The base station may receive the request to terminate the FD operation based at least on a timing different of an uplink reception timing and a downlink reception timing of the FD operation. The base station may receive the request to terminate the FD operation from the UE. In some aspects, the request to terminate the full duplex operation may comprise a request to switch to a half duplex operation. In some aspects, receipt of the request to terminate the full duplex operation may be based on the timing difference exceeding a threshold. The threshold may comprise a CP condition. In some aspects, the threshold may comprise a CP condition plus a delta TA value. The delta TA value may be within the CP condition at the base station side. The delta TA value may be configured to reduce the timing difference of the uplink reception timing and the downlink reception timing to maintain the full duplex operation. In some aspects, the uplink reception timing may be measured in SRS transmitted from an uplink beam and received by a downlink beam of the UE. In some aspects, the downlink reception timing may be measured in CSI-RS transmitted from the base station and received by a downlink beam of the UE.

At 1106, the base station may receive a request for an updated TA. For example, 1106 may be performed by request component 1242 of apparatus 1202. The base station may receive the request for the updated TA based on the timing difference of the uplink reception timing and the downlink reception timing. The base station may receive the request for the updated TA from the UE. The request for the updated TA may be based at least on L1-SINR measurements. In some aspects, the request for the updated timing advance may be sent after a period of time after a transmission of a previous request for an updated TA. The period of time for transmission of the request after the previous request may be preconfigured or configured by the base station. The period of time for transmission of the request after the previous request may be signaled, to the UE, by the base station via RRC signaling, MAC-CE, or DCI. In some aspects, the request to terminate the full duplex operation may be received, by the base station, if a plurality of requests for the updated timing advance, from the UE, are triggered within the period of time after the transmission of the previous request for the updated timing advance. Transmission of the plurality of requests for the updated timing advance may be prevented within the period of time, where the period of time may be preconfigured or signaled to the UE from the base station via RRC, MAC-CE, or DCI signaling.

At 1108, the base station may transmit an indication to terminate the FD operation. For example, 1108 may be performed by indication component 1244 of apparatus 1202. The base station may transmit, to the UE, the indication to terminate the FD operation.

At 1110, the base station may switch to an HD operation. For example, 1110 may be performed by HD component 1246 of apparatus 1202. The base station may switch to the HD operation in response to transmitting the indication to terminate the FD operation. The base station may switch to the HD operation in response to transmitting, to the UE, the indication to terminate the FD operation.

Figure 12:
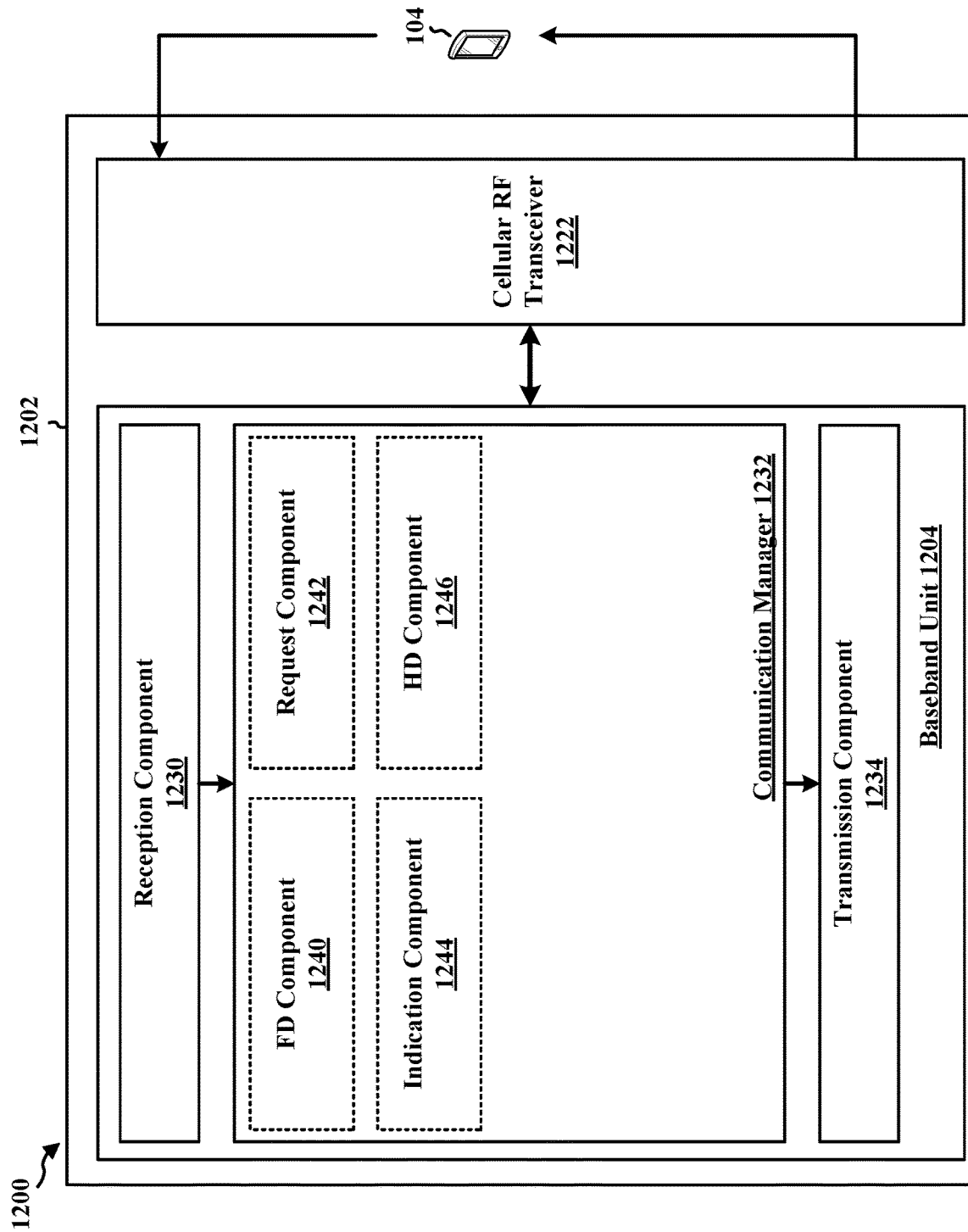
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an FD component 1240 that may communicate in an FD operation, e.g., as described in connection with 1002 of FIG. 10 or 1102 of FIG. 11. The communication manager 1232 further includes a request component 1242 that may receive a request to terminate the FD operation, e.g., as described in connection with 1004 of FIG. 10 or 1104 of FIG. 11. The request component 1242 may be further configured to receive a request for an updated TA, e.g., as described in connection with 1106 of FIG. 11. The communication manager 1232 further includes an indication component 1244 that may transmit an indication to terminate the FD operation, e.g., as described in connection with 1006 of FIG. 10 or 1108 of FIG. 11. The communication manager 1232 further includes an HD component 1246 that may switch to an HD operation, e.g., as described in connection with 1110 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for communicating with a UE in a full duplex operation. The apparatus includes means for receiving, from the UE, a request to terminate the full duplex operation based at least on a timing difference of an uplink reception timing and a downlink reception timing of the full duplex operation. The apparatus includes means for transmitting, to the UE, an indication to terminate the full duplex operation. The apparatus further includes means for receiving, from the UE, a request for an updated timing advance based on the timing difference of the uplink reception timing and the downlink reception timing. The apparatus further includes means for switching to a half duplex operation in response to transmitting the indication to terminate the full duplex operation. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to communicate with at least one TRP in a full duplex operation; measure a timing difference of an uplink reception timing and a downlink reception timing of the full duplex operation; and transmit, to the at least one TRP, a request to terminate the full duplex operation based at least on the timing difference.

Aspect 2 is the apparatus of aspect 1, further including a transceiver coupled to the at least one processor.

Aspect 3 is the apparatus of any of aspects 1 and 2, further includes that the request to terminate the full duplex operation comprises a request to switch to a half duplex operation.

Aspect 4 is the apparatus of any of aspects 1-3, further includes that the at least one processor is further configured to determine whether the timing difference exceeds a threshold.

Aspect 5 is the apparatus of any of aspects 1-4, further includes that the threshold comprises a CP condition.

Aspect 6 is the apparatus of any of aspects 1-5, further includes that the threshold comprises a CP condition plus a delta TA value, wherein the delta TA value is within the CP condition at the at least one TRP, wherein the delta TA value is configured to reduce the timing difference of the uplink reception timing and the downlink reception timing to maintain the full duplex operation.

Aspect 7 is the apparatus of any of aspects 1-6, further includes that the UE communicates with a first TRP in the full duplex operation, wherein the UE communicates with the first TRP and a second TRP in the full duplex operation.

Aspect 8 is the apparatus of any of aspects 1-7, further includes that the uplink reception timing is measured in SRS transmitted from an uplink beam and received by a downlink beam of the UE.

Aspect 9 is the apparatus of any of aspects 1-8, further includes that the downlink reception timing is measured in CSI-RS transmitted from a TRP and received by a downlink beam of the UE.

Aspect 10 is the apparatus of any of aspects 1-9, further includes that the at least one processor is further configured to transmit, to at least one base station, a request for an updated timing advance based on the timing difference of the uplink reception timing and the downlink reception timing.

Aspect 11 is the apparatus of any of aspects 1-10, further includes that the request for the updated timing advance is based at least on L1-SINR measurements.

Aspect 12 is the apparatus of any of aspects 1-11, further includes that transmission of the request for the updated timing advance is sent after a period of time after a transmission of a previous request for an updated timing advance.

Aspect 13 is the apparatus of any of aspects 1-12, further includes that the period of time for transmitting the request after the previous request is preconfigured or configured by the at least one base station, wherein the period of time for transmitting the request after the previous request is signaled, to the UE, by the at least one base station via RRC signaling, MAC-CE, or DCI.

Aspect 14 is the apparatus of any of aspects 1-13, further includes that the request to terminate the full duplex operation is transmitted if a plurality of requests for the updated timing advance are triggered within the period of time after the transmission of the previous request for the updated timing advance, wherein transmission of the plurality of requests for the updated timing advance is prevented within the period of time, wherein the period of time is preconfigured or signaled to the UE from a base station via RRC/MAC-CE/DCI signaling.

Aspect 15 is the apparatus of any of aspects 1-14, further includes that the at least one processor is further configured to switch to a half duplex operation in response to transmitting the request to terminate the full duplex operation.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, where the code when executed by a processor causes the processor to implement any of aspects 1-15.

Aspect 19 is an apparatus for wireless communication at a base station including at least one processor coupled to a memory and configured to communicate with a UE in a full duplex operation; receive, from the UE, a request to terminate the full duplex operation based at least on a timing difference of an uplink reception timing and a downlink reception timing of the full duplex operation; and transmit, to the UE, an indication to terminate the full duplex operation.

Aspect 20 is the apparatus of aspect 19, further including a transceiver coupled to the at least one processor.

Aspect 21 is the apparatus of any of aspects 19 and 20, further includes that the request to terminate the full duplex operation comprises a request to switch to a half duplex operation.

Aspect 22 is the apparatus of any of aspects 19-21, further includes that receipt of the request to terminate the full duplex operation is based on the timing difference exceeding a threshold.

Aspect 23 is the apparatus of any of aspects 19-22, further includes that the threshold comprises a CP condition or a CP condition plus a delta TA value, wherein the delta TA value is within the CP condition at the base station, wherein the delta TA value is configured to reduce the timing difference of the uplink reception timing and the downlink reception timing to maintain the full duplex operation.

Aspect 24 is the apparatus of any of aspects 19-23, further includes that the uplink reception timing is measured in SRS transmitted from an uplink beam and received by a downlink beam of the UE.

Aspect 25 is the apparatus of any of aspects 19-24, further includes that the downlink reception timing is measured in CSI-RS transmitted from the base station and received by a downlink beam of the UE.

Aspect 26 is the apparatus of any of aspects 19-25, further includes that the at least one processor is further configured to receive, from the UE, a request for an updated timing advance based on the timing difference of the uplink reception timing and the downlink reception timing.

Aspect 27 is the apparatus of any of aspects 19-26, further includes that the request for the updated timing advance is based at least on L1-SINR measurements.

Aspect 28 is the apparatus of any of aspects 19-27, further includes that the request for the updated timing advance is sent after a period of time after a transmission of a previous request for an updated timing advance.

Aspect 29 is the apparatus of any of aspects 19-28, further includes that the period of time for transmission of the request after the previous request is preconfigured or configured by the base station, wherein the period of time for transmission of the request after the previous request is signaled, to the UE, by the base station via RRC signaling, MAC-CE, or DCI.

Aspect 30 is the apparatus of any of aspects 19-29, further includes that the request to terminate the full duplex operation is received, by the base station, if a plurality of requests for the updated timing advance, from the UE, are triggered within the period of time after the transmission of the previous request for the updated timing advance, wherein transmission of the plurality of requests for the updated timing advance is prevented within the period of time, wherein the period of time is preconfigured or signaled to the UE from the base station via RRC signaling, MAC-CE, or DCI.

Aspect 31 is the apparatus of any of aspects 19-30, further includes that the at least one processor is further configured to switch to a half duplex operation in response to transmitting the indication to terminate the full duplex operation.

Aspect 32 is a method of wireless communication for implementing any of aspects 19-31.

Aspect 33 is an apparatus for wireless communication including means for implementing any of aspects 19-31.

Aspect 34 is a computer-readable medium storing computer executable code, where the code when executed by a processor causes the processor to implement any of aspects 19-31.

What is claimed is:

1. An apparatus for wireless communication at a user equipment (UE), comprising:
   memory; and
   at least one processor coupled to the memory and configured to:
      communicate with at least one transmission reception point (TRP) in a full duplex operation at the UE;
      measure, for the full duplex operation at the UE, a timing difference between a self-interference uplink reception timing at the UE and a downlink reception timing at the UE, wherein the self-interference uplink reception timing is associated with sounding reference signals (SRS) from an uplink beam of the UE and received by a downlink beam of the UE;
      determine that the timing difference exceeds a threshold; and
      transmit, to the at least one TRP, a request to terminate the full duplex operation based at least on the timing difference exceeding the threshold.

2. The apparatus of claim 1, further comprising a transceiver coupled to the at least one processor.

3. The apparatus of claim 1, wherein the request to terminate the full duplex operation comprises a request to switch to a half duplex operation.

4. The apparatus of claim 1, wherein the threshold comprises a cyclic prefix (CP) condition.

5. The apparatus of claim 1, wherein the threshold comprises a cyclic prefix (CP) condition plus a delta timing advance (TA) value, wherein the delta TA value is within the CP condition at the at least one TRP, wherein the delta TA value is configured to reduce the timing difference of the self-interference uplink reception timing at the UE and the downlink reception timing at the UE to maintain the full duplex operation.

6. The apparatus of claim 1, wherein to communicate with the at least one TRP in the full duplex operation of the UE, the at least one processor is configured to:
transmit uplink transmissions to a first TRP associated with the full duplex operation of the UE, wherein the self-interference uplink reception timing is based on a timing advance (TA) associated with the first TRP; and
receive downlink transmissions from a second TRP associated with the full duplex operation of the UE, wherein the downlink reception timing at the UE is based on a propagation delay associated with the second TRP.

7. The apparatus of claim 1, wherein to measure the timing difference, the at least one processor is configured to:
measure the self-interference uplink reception timing at the UE based on the SRS transmitted from the uplink beam and received by the downlink beam of the UE.

8. The apparatus of claim 1, wherein to measure the timing difference, the at least one processor is configured to:
measure the downlink reception timing at the UE based on channel state information reference signals (CSI-RS) transmitted from a first TRP of the at least one TRP and received by the downlink beam of the UE.

9. The apparatus of claim 1, wherein the at least one TRP comprises at least one base station, and wherein the at least one processor is further configured to:
transmit, to the at least one base station and based on the timing difference exceeding the threshold, an additional request for an updated timing advance to reduce the timing difference between the self-interference uplink reception timing at the UE and the downlink reception timing at the UE to be below the threshold.

10. The apparatus of claim 9, wherein the request for the updated timing advance is based at least on Layer-1 (L1) signal to interference plus noise ratio (SINR) (L1-SINR) measurements.

11. The apparatus of claim 9, wherein to transmit the request for the updated timing advance, the at least one processor is configured to:
transmit the request for the updated timing advance after a period of time after a transmission of a previous request for the updated timing advance.

12. The apparatus of claim 11, wherein the period of time for transmitting the request after the previous request is preconfigured or configured by the at least one base station, wherein the period of time is signaled, to the UE, by the at least one base station via at least one of radio resource control (RRC) signaling, a medium access control (MAC) control element (CE) (MAC-CE), or downlink control information (DCI).

13. The apparatus of claim 11, wherein the request to terminate the full duplex operation is transmitted if a plurality of requests for the updated timing advance are triggered within the period of time after the transmission of the previous request for the updated timing advance, wherein transmission of the plurality of requests for the updated timing advance is prevented within the period of time, wherein the period of time is one of preconfigured or signaled to the UE by the at least one base station via at least one of radio resource control (RRC) signaling, a medium access control (MAC) control element (CE) (MAC-CE), or downlink control information (DCI).

14. The apparatus of claim 1, wherein the at least one processor is further configured to:
switch to a half duplex operation in response to transmitting the request to terminate the full duplex operation.

15. A method of wireless communication at a user equipment (UE), comprising:
communicating with at least one transmission reception point (TRP) in a full duplex operation of the UE;
measuring, for the full duplex operation at the UE, a timing difference between a self-interference uplink reception timing at the UE and a downlink reception timing at the UE, wherein the self-interference uplink reception timing is associated with sounding reference signals (SRS) from an uplink beam of the UE and received by a downlink beam of the UE;
determining that the timing difference exceeds a threshold; and
transmitting, to the at least one TRP, a request to terminate the full duplex operation based at least on the timing difference exceeding the threshold.

16. The method of claim 15, wherein communicating with the at least one TRP in the full duplex operation of the UE comprises:
transmitting uplink transmissions to a first TRP associated with the full duplex operation of the UE, wherein the self-interference uplink reception timing is based on a timing advance (TA) associated with the first TRP; and
receiving downlink transmissions from a second TRP associated with the full duplex operation of the UE, wherein the downlink reception timing at the UE is based on a propagation delay associated with the second TRP.

17. The method of claim 15, wherein the at least one TRP comprises at least one base station, the method further comprising:
transmitting, to the at least one base station and based on the timing difference exceeding the threshold, an additional request for an updated timing advance to reduce the timing difference between the self-interference uplink reception timing at the UE and the downlink reception timing at the UE to be below the threshold.

18. An apparatus for wireless communication at a base station, comprising:
memory; and
at least one processor coupled to the memory and configured to:
communicate with a user equipment (UE) operating in a full duplex operation;
receive, from the UE and in association with the full duplex operation at the UE, a request to terminate the full duplex operation based at least on a timing difference between a self-interference uplink reception timing at the UE and a downlink reception timing at the UE, wherein the self-interference uplink reception timing is associated with sounding reference signals (SRS) from an uplink beam of the UE and received by a downlink beam of the UE, wherein receipt of the request to terminate the full duplex operation is based on the timing difference exceeding a threshold; and transmit, to the UE, an indication to terminate the full duplex operation.

19. The apparatus of claim 18, further comprising a transceiver coupled to the at least one processor.

20. The apparatus of claim 18, wherein the request to terminate the full duplex operation comprises an additional request to switch to a half duplex operation.

21. The apparatus of claim 18, wherein the threshold comprises a cyclic prefix (CP) condition or the CP condition plus a delta timing advance (TA) value, wherein the delta TA value is within the CP condition at the base station, wherein the delta TA value is configured to reduce the timing difference of the self-interference uplink reception timing at the UE and the downlink reception timing at the UE to maintain the full duplex operation.

22. The apparatus of claim 18, wherein the self-interference uplink reception timing at the UE is measured based on the SRS transmitted from the uplink beam and received by the downlink beam of the UE.

23. The apparatus of claim 18, wherein the downlink reception timing at the UE is measured based on channel state information reference signals (CSI-RS) transmitted from the base station and received by the downlink beam of the UE.

24. The apparatus of claim 18, wherein the at least one processor is further configured to:
receive, from the UE and based on the timing difference exceeding the threshold, an additional request for an updated timing advance to reduce the timing difference between the self-interference uplink reception timing at the UE and the downlink reception timing at the UE to be below the threshold.

25. The apparatus of claim 24, wherein the request for the updated timing advance is based at least on Layer-1 (L1) signal to interference plus noise ratio (SINR) (L1-SINR) measurements.

26. The apparatus of claim 24, wherein to receive the request for the updated timing advance, the at least one processor is configured to:
receive the request for the updated timing advance after a period of time after a receipt of a previous request for the updated timing advance.

27. The apparatus of claim 26, wherein the period of time for transmission of the request after the previous request is preconfigured or configured by the base station, wherein the period of time after the previous request is signaled, to the UE, by the base station via at least one of radio resource control (RRC) signaling, a medium access control (MAC) control element (CE) (MAC-CE), or downlink control information (DCI).

28. The apparatus of claim 26, wherein the request to terminate the full duplex operation is received, by the base station, if a plurality of requests for the updated timing advance, from the UE, are triggered within the period of time after the reception of the previous request for the updated timing advance, wherein a transmission of the plurality of requests for the updated timing advance is prevented within the period of time, wherein the period of time is preconfigured or signaled to the UE from the base station via at least one of radio resource control (RRC) signaling, a medium access control (MAC) control element (CE) (MAC-CE), or downlink control information (DCI).

29. The apparatus of claim 18, wherein the at least one processor is further configured to:
switch to a half duplex operation in response to transmitting the indication to terminate the full duplex operation.

30. A method of wireless communication at a base station, comprising:
communicating with a user equipment (UE) operating in a full duplex operation;
receiving, from the UE and in association with the full duplex operation at the UE, a request to terminate the full duplex operation based at least on a timing difference between a self-interference uplink reception timing at the UE and a downlink reception timing at the UE, wherein the self-interference uplink reception timing is associated with sounding reference signals (SRS) from an uplink beam of the UE and received by a downlink beam of the UE, wherein receipt of the request to terminate the full duplex operation is based on the timing difference exceeding a threshold; and
transmitting, to the UE, an indication to terminate the full duplex operation.

* * * * *